US006078910A

United States Patent [19]

Brookner et al.

[11] Patent Number: 6,078,910

[45] Date of Patent: Jun. 20, 2000

[54] PRINTING POSTAGE WITH CRYPTOGRAPHIC CLOCKING SECURITY

[75] Inventors: George Brookner; Michael Brown, both of Norwalk; Fetneh Eskandari, Middletown; Robert Schwartz, Branford, all of Conn.

[73] Assignee: Ascom Hasler Mailing Systems Inc., Shelton, Conn.

[21] Appl. No.: 09/051,877

[22] PCT Filed: Aug. 20, 1997

[86] PCT No.: PCT/US97/14571

§ 371 Date: Apr. 20, 1998

§ 102(e) Date: Apr. 20, 1998

[87] PCT Pub. No.: WO98/08325

PCT Pub. Date: Feb. 26, 1998

Related U.S. Application Data

[60] Provisional application No. 60/023,352, Aug. 20, 1996.

[51] Int. Cl.[7] ........ H04L 9/00

[52] U.S. Cl. ........ 705/60; 705/51

[58] Field of Search ........ 705/410, 403, 705/51, 60; 380/51, 30; 713/138, 157, 178

[56] References Cited

U.S. PATENT DOCUMENTS

| | | | |
|---|---|---|---|
| 4,725,718 | 2/1988 | Sansone et al. | 235/495 |
| 4,757,537 | 7/1988 | Edelmann | 380/51 |
| 4,775,246 | 10/1988 | Edelmann et al. | 380/23 |
| 4,868,877 | 9/1989 | Fischer | 713/157 |
| 5,001,752 | 3/1991 | Fischer | 713/138 |
| 5,022,080 | 6/1991 | Durst | 713/178 |
| 5,444,780 | 8/1995 | Hartman, Jr. | 380/30 |
| 5,606,314 | 2/1997 | Mitsuhashi et al. | 340/825.69 |
| 5,606,613 | 2/1997 | Lee et al. | 380/21 |

*Primary Examiner*—Edward R. Cosimano
*Assistant Examiner*—Thomas A. Dixon
*Attorney, Agent, or Firm*—Oppedahl & Larson LLP

[57] ABSTRACT

Secure activities are carried out between a client (23) and a server (21) in connection with the printing of postage. A cryptographically secure exchange (22) is employed so as to establish a common time base (24, 25), said common time base obviating a constant (e.g. battery) power supply. The postage-printing client (23) thus does need not have a reliable power supply in the absence of AC (mains) power.

6 Claims, 4 Drawing Sheets

PRINTING POSTAGE WITH CRYPTOGRAPHIC CLOCKING SECURITY

This application claims the benefit of U.S. Provisional application Ser. No. 60/023,352 filed Aug. 20, 1996, which application is hereby incorporated herein by reference.

TECHNICAL FIELD

The invention relates generally to establishing conditions for secure activities between a client and a server in connection with the printing of postage, and relates specifically to printing postage employing a cryptographically secure exchange to establish a common time base, said common time base obviating a constant (e.g. battery) power supply.

BACKGROUND ART

If one takes into account the many constraints (cost, post office approval, customer requirements, mechanical requirements, human readability) that must be simultaneously satisified, it may fairly be said that it is not easy to print postage. For nearly a hundred years, companies such as Hasler (a predecessor of the assignee of the present invention) and its competitors have provided postage meters which print postage by means of mechanical relief die plates. Generations of mechanical engineers have developed and refined the art of mechanical printing of postage so that today's postage meters (also called franking machines) offer a high-quality die-printed postage indicium together with the all the benefits flowing from the use of microprocessors.

It has been recently suggested to use digitally formed indicia instead of die-printed indicia, a move which would discard a substantial fraction of the accumulated experience with die printing of postage and which opens up a host of new problems. The printing technologies most often proposed for digitally formed indicia are ink-jet and laser printing. These technologies have many potential disadvantages. Among them is that if the postal indicia are to be printed with an off-the-shelf printer connected to a postal security device via a nonsecure data link, then encrypted information must be printed within the indicia to assist in distinguishing between authentic and fraudulent indicia. The encrypted information is generated by cryptographic apparatus within the postal security device.

It is considered desirable, and is known in the art, to provide time and date information as inputs to the cryptographic apparatus within the postal security device (PSD or client). The encrypted information from the PSD is applied to a mail piece in the postal indicia. Such information is more helpful to the post office for authentication purposes than an indicium that lacks any encrypted information containing time/date information.

At least one postal authority has suggested that it is preferable to have, within the postal security device, a time base that is powered by a reliable power supply that is provided without interruption even when AC (mains) power is removed. With such a device, even when the power is turned off or disconnected by a user (or is lost due to a utility power outage) the time base or real-time clock is continuously running, consuming power from the internal reliable power supply.

For the internal time base to be of any meaningful help for authentication purposes, it must be quite accurate, typically requiring an accuracy better than that of a consumer wristwatch. Such a time base generally relies upon a crystal oscillator, and the crystal for this purpose is more expensive than the inexpensive crystal used in a consumer wristwatch.

The high-accuracy time base and internal reliable power supply all add to the cost of the postal security device.

Such a system generally relies on the internal power source working without interruption, and in the event of loss of the internal power source, a variety of manual steps are generally required to restore normal function, steps including taking the postal security device out of service. Such steps are at best annoying to the user, and may be very disruptive for the user.

It would be desirable to reduce the cost of the postal security device, to make it less likely to require being taken out of service, and yet to maintain the authentication benefits that come from the use of a consistent time base that matches the rest of the system.

DISCLOSURE OF INVENTION

Secure activities are carried out between a client and a server in connection with the printing of postage. A cryptographically secure exchange is employed so as to establish a common time base, said common time base obviating a constant (e.g. battery) power supply. The postage-printing client thus need not have a reliable power supply in the absence of AC (mains) power.

BRIEF DESCRIPTION OF DRAWING

The invention will be described in connection with a drawing in several figures, of which.

MODES FOR CARRYING OUT INVENTION

Figure 1:
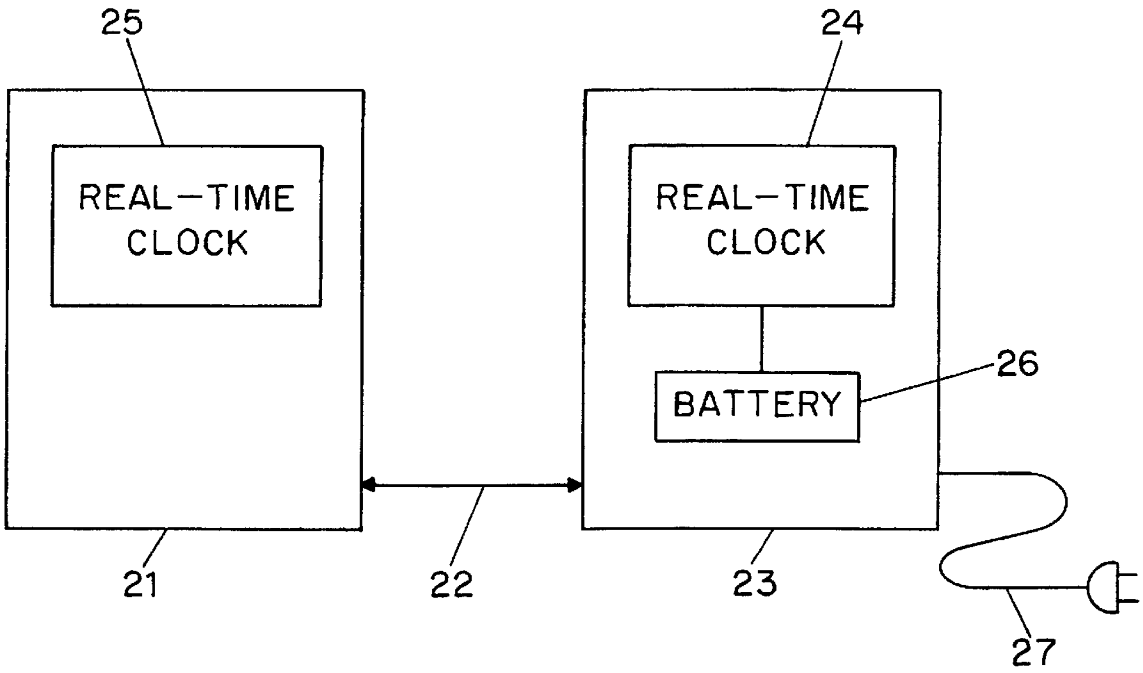
FIG. 1 PRIOR ART
FIG. 1 shows a prior-art arrangement of a postal security device together with a system.

FIG. 1 shows a prior-art arrangement of a postal security device together with a system. Postal security device (client) 23 is used to print postage by means of an off-the-shelf printer (omitted for clarity in FIG. 1). Power is provided by AC (mains) power cord 27. A real-time clock 24 keeps highly accurate time, and is sustained in the absence of external power by means of internal reliable battery or other power source 26. From time to time, the client 23 is in communication over nonsecure channel 22 with a server 21, for example for resetting the client 23 to contain more postage value. Real-time clock 25 is presumed to be highly accurate. Because the number of servers 21 is very small (in contrast to the large number of clients 23), the high cost of the highly accurate real-time clock 25 is not a problem. Indeed the distinction is not so much between the client 23 and the server 21, as it is a distinction between the client 23 and the rest of the world, including the apparatus (omitted for clarity in FIG. 1) used by the postal authorities to authenticate postal indicia. The numerous such apparatus are all capable of receiving trustworthy time and date information since they are all physically controlled by the postal authority. As noted above, however, the PSD clients 23 are not physically controlled by the postal authorities, and they are great in number, thus prompting the prior-art assumption that the only workable way of providing a time standard for use in the clients 23 is by means of an internal reliable power supply and highly accurate time base.

Figure 2:
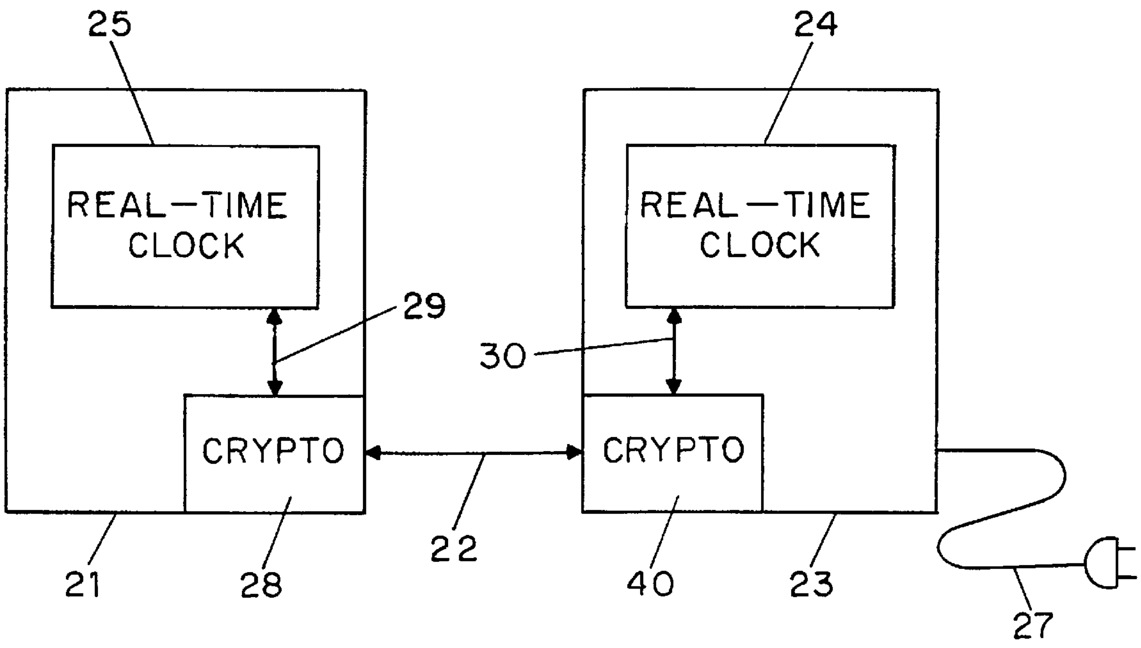
FIG. 2 shows a arrangement of a postal security device together with a system in accordance with the invention.

FIG. 2 shows a arrangement of a postal security device together with a system in accordance with the invention. In this arrangement, as in the prior art, the client PSD 23 has a real-time clock. But importantly, upon power-up of the PSD 23, or at some time thereafter, the PSD conducts a cryptographically secure communication via nonsecure channel 22 with a trusted time base, here presumed to be within server 21. The communication may desirably be cryptographically secure as set forth in FIPS PUB 140-1, but preferably one skilled in the art can select a level of cryptographic security appropriate to the needs of the particular system. The assumption is that the trusted time base (clock 25 in FIG. 2) is a certified trusted third party, certified by the postal authority both as to the accuracy of its time information as to the desired level of security of the cryptographic exchange used to communicate the time information to the client 23.

The certified real-time clock could be operated by the manufacturer (vendor) of the postal security devices or by the postal service, or by third parties.

Those skilled in the art will appreciate that many communications channels 22 would serve the desired purpose, including Internet TCP/IP connectivity between the client 23 and a certified real-time clock. In a typical system, the postal security device would be employed in a business premises with a local area network that is TCP/IP-connected with the Internet, and the PSD would have an ethernet interface permitting it to be plugged into the local area network. In this way, there would be no need for a dedicated telephone line for modem-based communications. Such a configuration offers the further benefit that external devices (e.g. from the manufacturer of the PSD or the postal authorities) could initiate communications for a variety of purposes.

Figure 7:
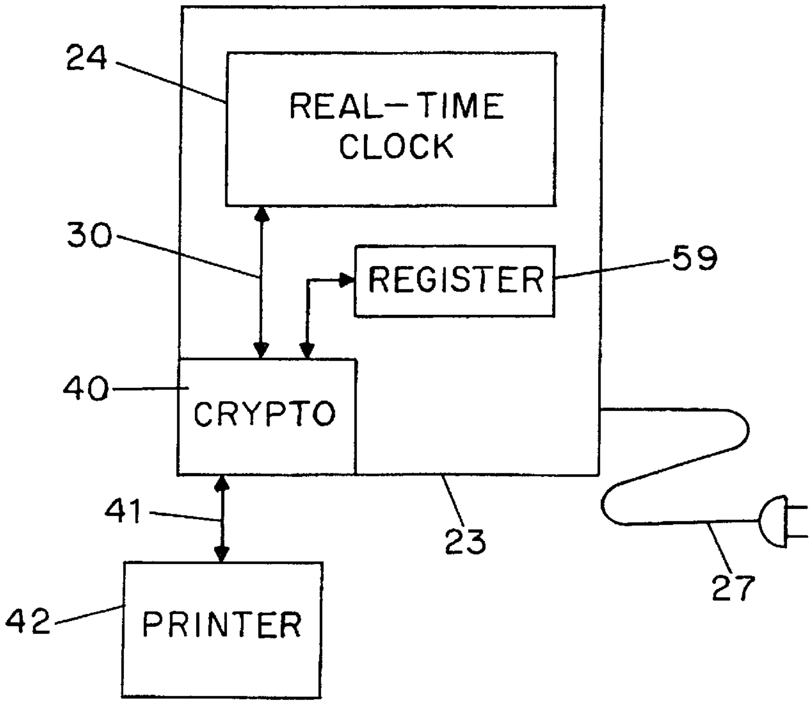
FIG. 7 shows a postage printing apparatus in accordance with the invention, including a postal security device.

Turning now to FIG. 7, there is shown a postage printing apparatus in accordance with the invention, including a postal security device 23. The cryptographic apparatus 40 is used to generate the encrypted indicia that are printed on the printer 42. The communications channel 41 between the PSD 23 and the printer 42 is presumed to be nonsecure. A postage value register 59 contains information about the amount of postage value printed or available to be printed. If the available postage is exhausted (i.e. the postage meter is empty) then no indicia are printed at the printer 42.

Figure 3:
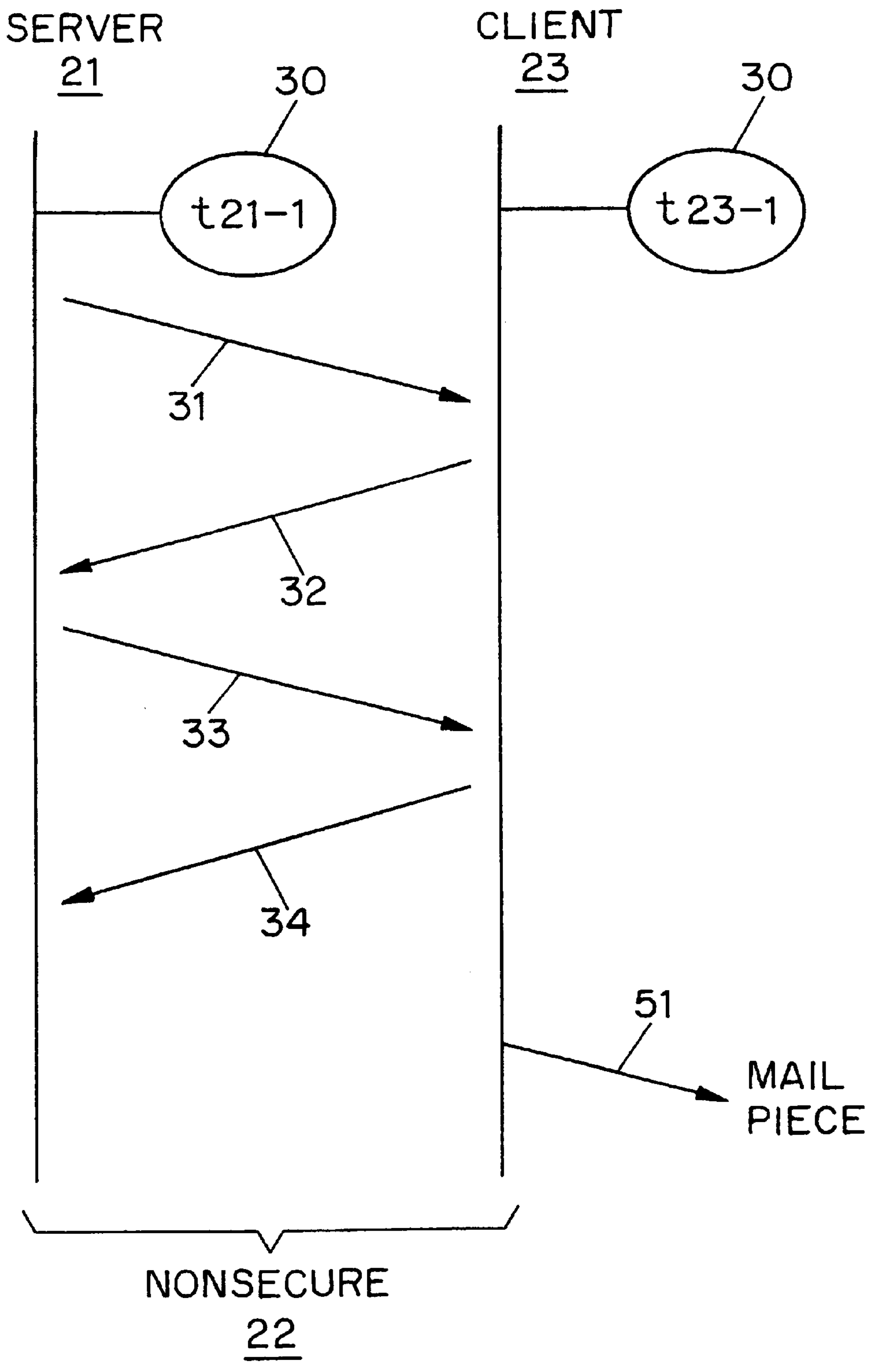
FIG. 3 PRIOR ART
FIG. 3 shows a prior-art exchange of messages between a client and server.

Returning to FIG. 3, there is shown a prior-art exchange of messages between a client and server. The server 21 and client 23 are presumed to have nearly the same time (t21-1 and t23-1, reference numeral 30) because each has a very accurate clock. With times thus synchronized, an exchange of data packets 31, 32, 33, and 34 may take place from time to time, for example to reset the PSD client 23 to contain more postage value, or for other purposes such as collection of statistical data. Also from time to time an encrypted mess age 51 is passed to the nonsecure printer (omitted for clarity in FIG. 3) and is printed on a mail piece. Data packets 31–34 pass over nonsecure channel 22 as described above. The packet exchanges may for example be those described in U.S. Pat. No. 5,237,506, owned by the present applicant.

Figure 4:
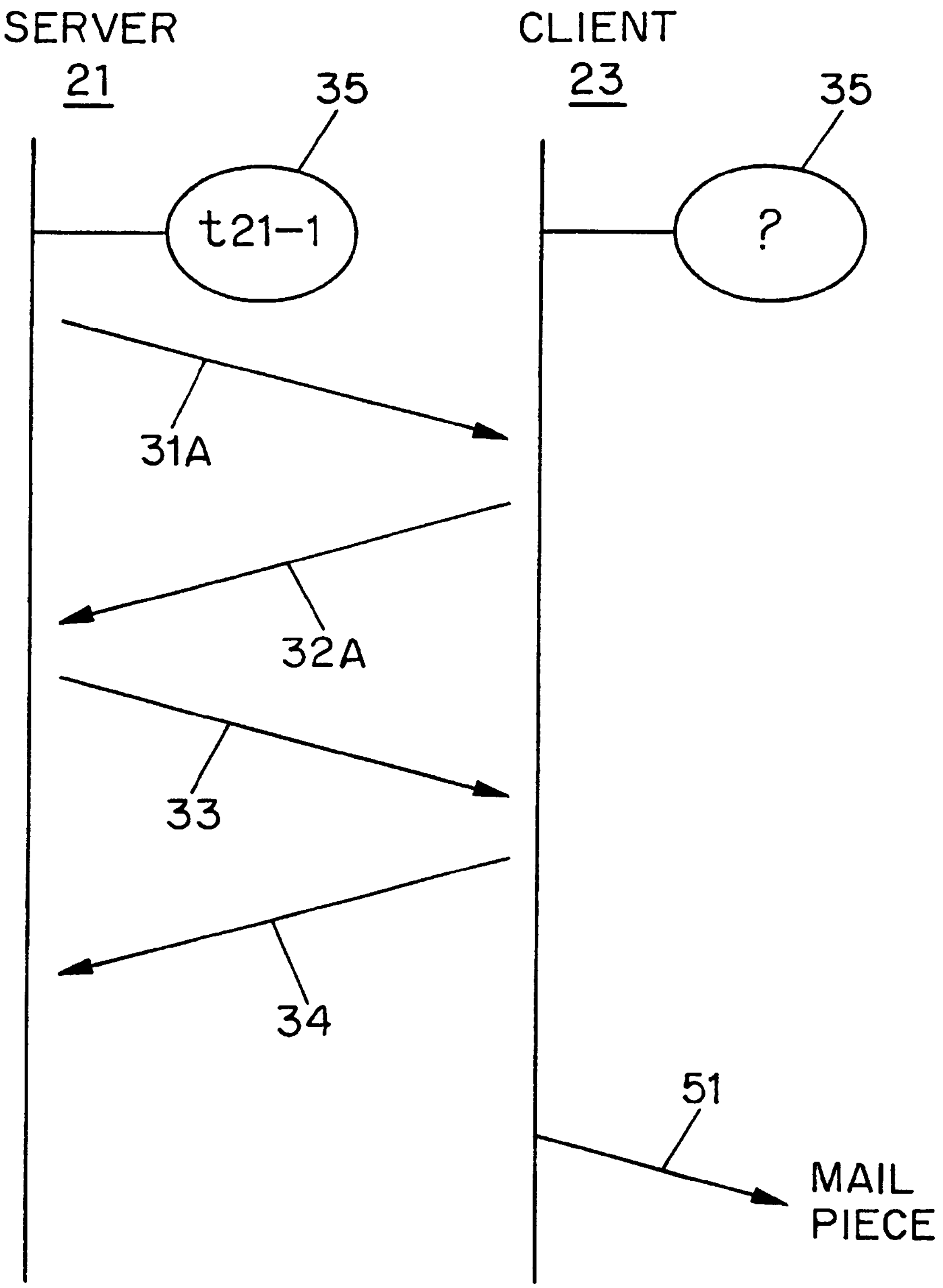
FIG. 4 shows an exchange of messages between a client and server in accordance with the invention.

FIG. 4 shows an exchange of messages between a client and server in accordance with the invention. In this arrangment, it is understood that the PSD 23 has been powered up, and does not know what time it is, as depicted by the question mark in FIG. 4 (reference numeral 35). Then, in some exchange of packets such as 31A, 32A in FIG. 4, a cryptographically secure communication occurs in which the presumed accurate time t21-1 is communicated to the client PSD 23. The PSD 23 loads the time into its time base and the time is used in subsequent cryptographic activities such as the printing of a postal indicia in data item 51.

Figure 5:
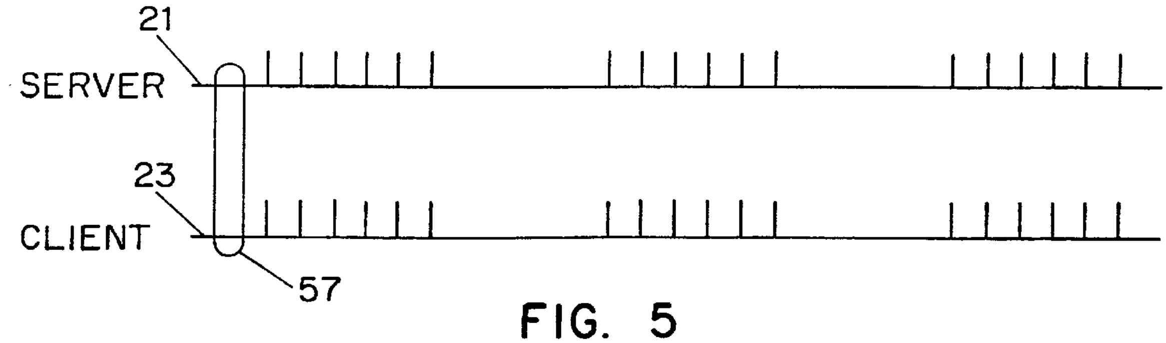
FIG. 5 PRIOR ART
FIG. 5 shows a prior art time line depicting time correspondence between a client postal security device and server.

FIG. 5 shows a prior art time line depicting time correspondence between a client postal security device and server. The real-time clocks of the PSD client 23 and the trusted time base of the server 21 are synchronized once at time 57, perhaps at the time of manufacture. Thereafter, the authentication activities undertaken by the postal authorities assume that subsequent events are simultaneous as depicted by vertically aligned event ticks in FIG. 5.

Figure 6:
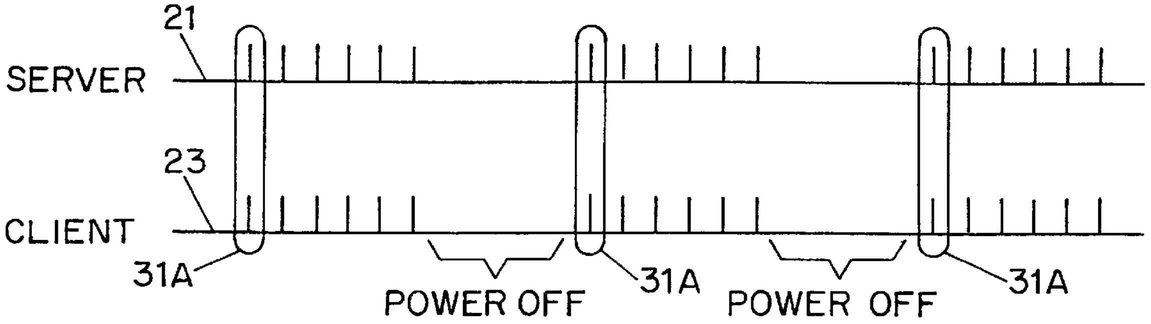
FIG. 6 shows a time line depicting time correspondence between a client postal security device and server according to the invention.

FIG. 6 shows a time line depicting time correspondence between a client postal security device and server according to the invention. In this time line, there are periods of time during which no external power is applied to the PSD client 23 and it has no continuous timekeeping by its internal time base. Instead, from time to time the secure synchronization takes place (shown by events 31A) as discussed above. The result is that the time bases of the client 23 and the presumed correct server 21 are more nearly in synchronization.

It will be recalled that the cryptographically secure time base communication permits the use, within the postal security device, of a time base that need not be as accurate (and expensive) as the highly accurate time base that would be called for in a prior art system. In the embodiments previously described, a time synchronization takes place at least as often as once-per application of AC (mains) power to the postal security device. It must be appreciated, however, that time drift thereafter (while AC power continues to be present) may lead to a condition in which the client time value differs unduly from that of the rest of the world (and of the server time source). Thus, it is desirable to provide an optional functionality in that the PSD may keep record of the number of franking events (printings of postage) since the last cryptographic exchange in which the time was synchronized with the trusted standard. When some number of frankings has occurred (e.g. fifty), the PSD may be programmed to require that another cryptographically secure time synchronization be performed before any further frankings will be done. Alternatively, it may be desirable to configure the PSD so that when some interval of time has passed, the PSD will require that another cryptographically secure time synchronization be performed before any further frankings will be done. In this way, the cost of the PSD may be further reduced in that the time base within the PSD need not be highly accurate but need merely have small enough drift that the accumulated error will be small within the preset number of frankings or the preset time interval.

What is claimed is:

1. A system for printing postage indicia, said system comprising first and second apparatus, said second apparatus connected via a nonsecure link to a printer printing said indicia, said second apparatus powered by interruptable external power, said second apparatus comprising a second time base functioning only in the presence of said external power, said first apparatus comprising a trusted first time base, said second apparatus further comprising a register indicative of postage value printed at said printer, said indicia containing encrypted information based at least upon the contents of the register and upon the contents of the second time base, said second time base synchronized with said first time base by means of a cryptographically secure communication subsequent to provision of said external power to said second apparatus.

2. The system of claim 1 wherein the synchronization is repeated after a predetermined number of indicia are printed and before any subsequent indicia are printed.

3. The system of claim 1 wherein the synchronization is repeated after a predetermined interval of time has elapsed and before any subsequent indicia are printed.

4. A method for use with first and second time bases for printing of postage indicia at a printer, said first time base constituting a trusted time base, said second time base being a component of a first apparatus, said second time base functioning only when external power is applied to said first apparatus, said indicia containing encrypted information based at least upon the contents of a register indicative of postage value printed at the printer, and upon the contents of the second time base, the method comprising the steps of: applying external power to said first apparatus, thereby applying power to the second time base and causing the second time base to begin functioning, synchronizing the second time base to the first time base via a cryptographically secure communication between the first and second time bases, calculating the encrypted information, communicating the encrypted information to the printer, and printing the indicia at the printer.

5. The method of claim 4 wherein the synchronization is repeated after a predetermined number of indicia are printed and before any subsequent indicia are printed.

6. The method of claim 4 wherein the synchronization is repeated after a predetermined interval of time has elapsed and before any subsequent indicia are printed.

* * * * *